Aug. 26, 1924.
H. GANSEL
1,506,522
PORTABLE ELECTRIC FAN
Filed Feb. 28, 1923
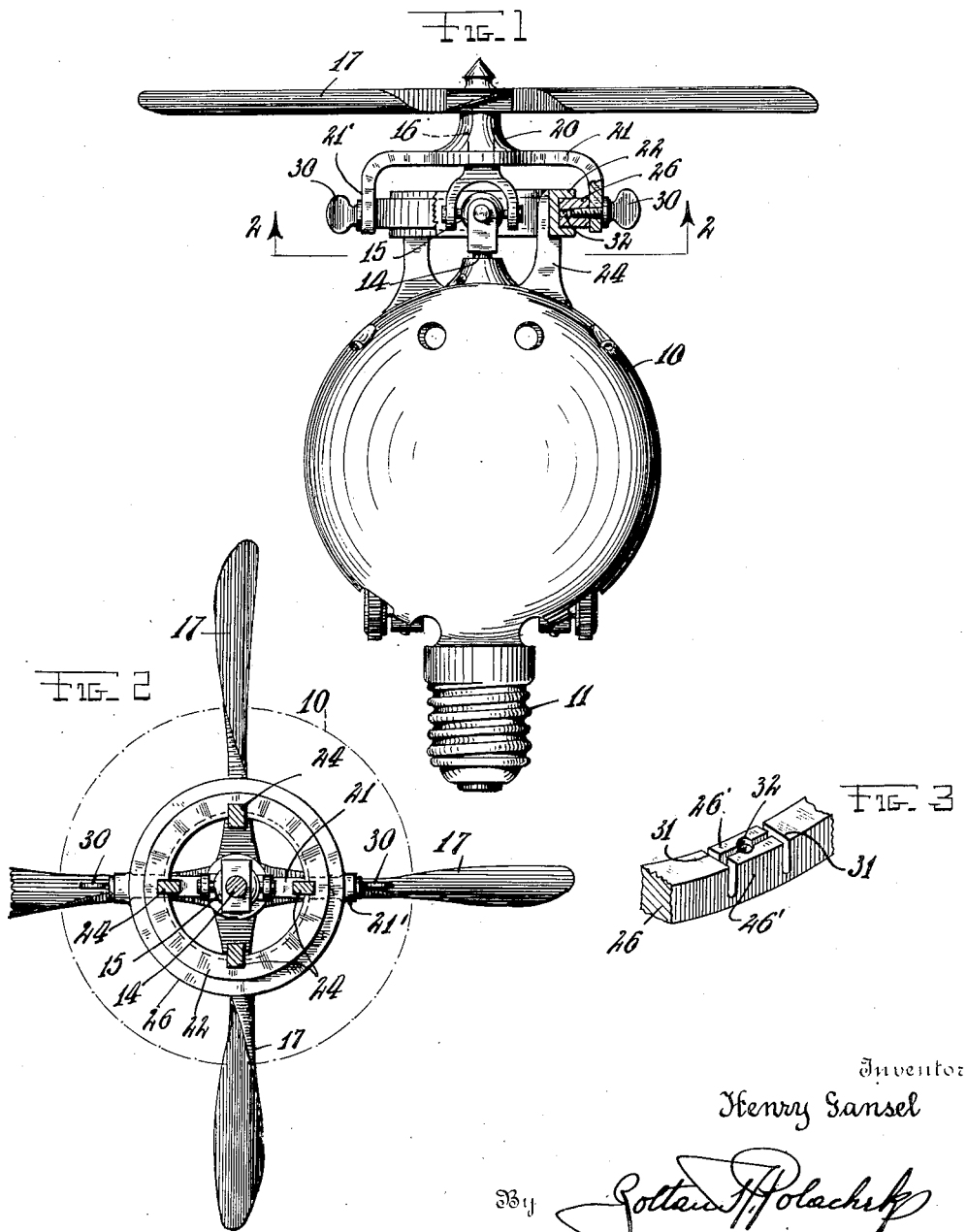
Inventor
Henry Gansel
By
Attorney Patented Aug. 26, 1924.

1,506,522

UNITED STATES PATENT OFFICE.

HENRY GANSEL, OF NEW YORK, N. Y.

PORTABLE ELECTRIC FAN.

Application filed February 28, 1923. Serial No. 621,757.

*To all whom it may concern:*

Be it known that I, HENRY GANSEL, a citizen of the United States, residing at New York, in the county of New York and State of New York, have invented certain new and useful Improvements in Portable Electric Fans, of which the following is a specification.

This invention relates generally to electric fans, having more particular reference to a small portable fan which may be connected as an integral unit directly to any ordinary light fixture by which is is carried after the fashion of an ordinary light bulb.

The invention has for an object to provide a novel and simple device of this kind having features of adjustability whereby the breeze from the fan may be directed at an angle to the axis of the motor.

For further comprehension of the invention, and of the objects and advantages thereof, reference will be had to the following description and accompanying drawings and to the appended claims in which the various novel features of the invention are more particularly set forth.

Fig. 1 of the drawings, is a side view, with parts in axial section, of my improved electric fan.

Fig. 2 is a transverse sectional view taken on the line 2—2 of Fig. 1.

Fig. 3 is a fragmentary perspective view of the ring on the motor casing with which the fan shaft bracket is engaged.

Referring now to the drawing, the reference numeral 10 indicates an electric motor of known type which is provided with a rigid plug contact member 11 adapted to be threaded into an ordinary light socket and to which the motor leads connect. The shaft of the rotor of this motor is indicated as at 14 and it is connected at one end by means of a universal joint 15 with a second and shorter shaft 16 which has a fan 17 mounted on its outer end and which I therefore term the fan shaft. The fan is here shown as of the four-bladed type, although this may be varied if desired.

To support this shaft I provide a bracket comprising a hub 20 from which a pair of opposed arms 21 project these arms being curved rearwardly at their outer ends as at 21' over the universal joint. Fixed to the motor casing, in a common plane with said universal joint, is a channeled ring 22 which is here shown as carried on four projections 24 from the said casing.

In this ring is slidably fitted a second ring 26 of rectangular cross section and to which the arms 21 are pivotally attached, the pivotal point or these arms being in the same plane as the axes of the universal joint 15, thus permitting the supporting bracket for the fan shaft to be swung from one side to the other, to vary the angle of said fan shaft, without affecting the operation of said universal joint.

The arm ends 21' are connected to the ring 26 by means of a pair of wingheaded screws 30 which pass freely through suitable apertures in the ends of said arms, the parts being preferably so arranged that by tightening these screws the arms are clamped to the ring 26 and the latter is clamped or bound in the channeled ring 22. To this end the ring 26 is formed on its inner face with pairs of transverse slots or grooves 31, the respective grooves of each pair being arranged one on each side of the aperture, such as 32 through which the screw 30 is passed. These slots 31 are connected by a third slot or groove 33 which is also formed on the inner face of the ring and which intersects the said aperture. This aperture is screw-threaded, and the sides thereof are slightly tapered so that when the screw 30 is threaded inwardly it will cause the two wings 26' left in the ring by the above mentioned slots to spread outward and bind against the walls of the channeled ring 22 at the same time that the head of the screw clamps down on the arms 21.

It will be apparent then, from the foregoing description, that the angle of the fan shaft 16 may be readily varied as may be desired to direct the breeze from the fan to one side or the other.

While I have illustrated and described a preferred embodiment of my invention it is to be understood that I do not limit myself to the precise construction herein disclosed, and that various changes and modifications might be made therein without departing from the spirit and scope of the invention as defined in the appended claims.

Having thus described my invention what I claim as new and desire to protect by Letters Patent of the United States is as follows:

1. A device of the class described comprising an electric motor having rigid therewith a plug adapted for connection to a light socket, a fan driven by the rotor of the said motor, and a universal joint connection between the fan shaft and the rotor shaft, and a support for the fan shaft adapted to ho'd the latter at varying angles with respect to the rotor shaft, said support comprising a bracket in which the fan shaft is journaled, a ring rotatable on the motor, a pair of diametrically opposed arms projecting rigidly from said bracket and pivotally connected at their ends with said ring, and means for rigidly attaching said arms to said ring.

2. A device of the class described comprising an electric motor having rigid therewith a plug adapted for connection to a light socket, a fan driven by the rotor of the said motor, and a universal joint connection between the fan shaft and the rotor shaft, and a support for the fan shaft adapted to hold the latter at varying angles with respect to the rotor shaft, said support comprising a bracket in which the fan shaft is journaled, a ring rotatable on the motor, a pair of diametrically opposed arms projecting rigidly from said bracket and pivotally connected at their ends with said ring, and means for rigidly attaching said arms to said ring, and the latter to the motor casing.

3. A device of the class described comprising an electric motor having rigid therewith a plug adapted for connection to a light socket, a fan driven by the rotor of the said motor, and a universal joint connection between the fan shaft and the rotor shaft, and a support for the fan shaft adapted to hold the latter at varying angles with respect to the rotor shaft, said support comprising a bracket in which the fan shaft is journaled, a ring rotatable on the motor, a pair of diametrically opposed arms projecting rigidly from said bracket and pivotally connected at their ends with said ring, and a common means for binding said arms to the said ring and the latter to the motor casing.

4. A device of the class described comprising an electric motor having rigid therewith a plug adapted for connection to a light socket, a fan driven by the rotor of the said motor, a shaft on which said fan is fixed, a universal joint connecting said fan shaft with the rotor shaft, a channeled ring supported by the motor in a common plane with the said universal joint, a second ring slidable in the first ring, a bracket supporting the said fan shaft and comprising a hub and a pair of arms radiating therefrom, and screws passed through the ends of said arms and adapted to lock the same to the second ring and the latter to the first ring.

In testimony whereof I have affixed my signature.

HENRY GANSEL.